Patented Feb. 3, 1942

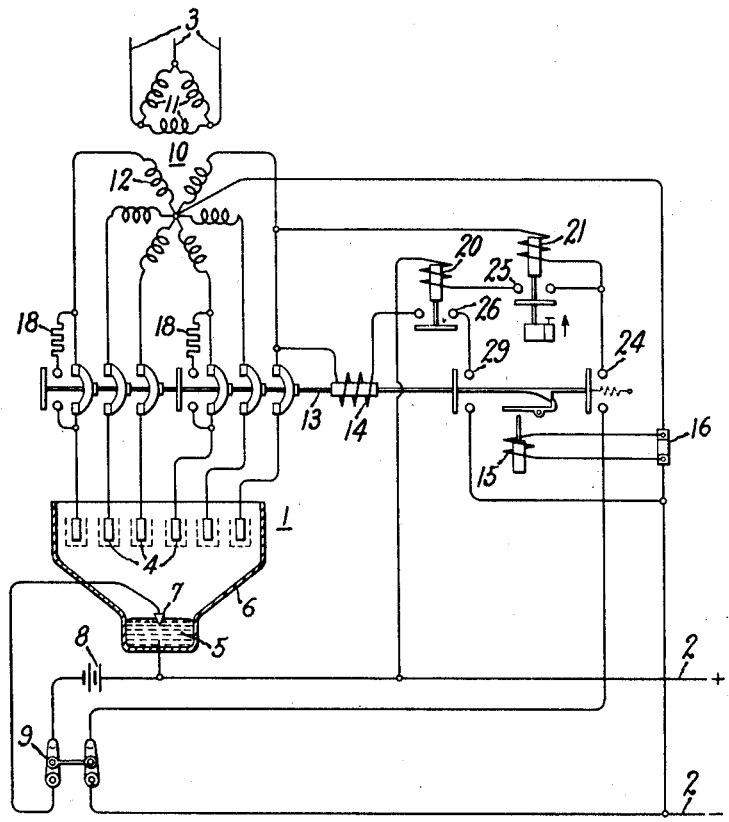

2,271,965

UNITED STATES PATENT OFFICE 2,271,965

CONTROL SYSTEM FOR ELECTRIC VALVES

Herman Bany, Lansdowne, Pa., assignor to General Electric Company, a corporation of New York Application July 16, 1940, Serial No. 345,745

6 Claims. (Cl. 175—363)

My invention relates to control systems for electric valves and particularly to systems for controlling the connections of an electric valve which is connected between an alternating current supply circuit and a direct current load circuit. In order to reduce the cost of the control apparatus, it has been proposed that the direct current terminals of the electric valve be permanently connected to the direct current load circuit and a multiple pole circuit interrupter be connected between the alternating current terminals of the electric valve and the power transformer which supplies alternating current to the valve. With such an arrangement it is desirable not to close the circuit interrupter when a fault exists on the direct current load circuit, and one object of my invention is to provide an arrangement for preventing the interrupter between the electric valve and the alternating current circuit from being closed as long as there is a fault connected to the load circuit.

In accordance with the preferred embodiment of my invention, I connect suitable current limiting means across a sufficient number of poles of the interrupter so that a relatively small current is supplied to the load circuit by the valve when the interrupter is open, and control the closing of the interrupter in accordance with the voltage drop produced across the load circuit by this relatively small current.

My invention will be better understood from the following description taken in connection with the accompanying drawing, the single figure of which diagrammatically illustrates an electric valve control system embodying my invention, and its scope will be pointed out in the appended claims.

Referring to the drawing, 1 represents an electric valve for supplying direct current to a load circuit 2 from an alternating current supply circuit 3. As shown, the valve 1 is of the type employing an ionizable medium and comprising a plurality of anodes 4 and a mercury pool 5 within a single receptacle or tank 6. The valve 1 also is provided with suitable means, examples of which are well known in the art, for striking and holding an arc within the tank 6 while the valve is in service. However, since the details of such means form no part of my present invention, I have merely shown for simplicity a starting anode 7 which may have a starting voltage applied thereto from a suitable voltage source 8 when a starting switch 9 is closed.

The electric valve 1 is connected to be energized from the three-phase circuit 3 through a transformer 10 shown as having a delta-connected primary winding 11 and a six-phase star-connected secondary winding 12 which is connected to six anodes 4 by suitable switching means shown as a six pole circuit interrupter 13 of the latch closed type. This interrupter is provided with a closing coil 14 and with a trip coil 15 which is connected in series relation with the load circuit 2 and the electric valve 1 by means of a shunt 16. The negative side of the direct current load circuit 2 is permanently connected to the neutral point of the secondary winding 12 of the transformer 10, and the positive side of the load circuit 2 is permanently connected to the mercury pool 5.

In accordance with my invention, I control the closing of the interrupter 13 in accordance with the resistance of the load connected to the load circuit 2. In the particular embodiment shown, I accomplish this result by connecting suitable current limiting means, such as a resistor 18, across one or more poles of the interrupter 13 so that, when the circuit breaker is open, the valve 1 supplies only a relatively small current to the load circuit 2 even under fault conditions. In the particular arrangement shown two separate resistors 8 are respectively connected across diametrically opposite poles of the circuit breaker 13 so that full-wave rectification is obtained, but it will be obvious that my invention is not limited to any particular number of resistors since my invention is operative with resistors connected across any number of poles of the circuit breaker 13. For effecting the closing of the circuit breaker 13 when the load connected to the load circuit is normal, I provide a voltage relay 20 which is arranged to be connected across the load circuit 2 by a time relay 21 a predetermined time after the circuit breaker 13 opens and the starting arc has been established. The voltage relay 20 is designed so that it operates in response to a voltage above a predetermined value and controls an energizing circuit for the closing coil 14 of the circuit breaker 13.

The operation of the embodiment of my invention shown in the drawing is as follows:

When it is desired to place the electric valve in service, the supply circuit 3 is energized at normal voltage and the starting switch 9 is closed so that a circuit is completed from the battery 8 through the starting anode 7 to establish a starting and holding arc in a manner well known in the art but not shown in the drawing. As soon as the starting arc is established, a small direct current is supplied to the load circuit by the electric valve 1 through the resistors 18 which have a much higher resistance than the normal full load resistance. Consequently the voltage drop produced across the load circuit 2 by this reduced current is very small under fault conditions. In practice, this reduced current may be as low as 2% of the normal full load current when there is a fault connected to the load circuit.

The closing of the starting switch 9 also completes an energizing circuit for the time relay 21 through the auxiliary contacts 24 of the open circuit breaker 13. After being energized for a predetermined time, relay 21 closes its contacts 25 and connects the winding of the voltage relay 20 across the load circuit 2. If the load resistance is above a predetermined value, which is usually its full load value, the voltage across the load circuit is sufficient to cause the relay 20 to close its contacts 26 and complete an energizing circuit for the closing coil 14 to close the circuit breaker 13. The anodes 4 of the electric valve 1 are then connected directly to the secondary terminals of the transformer 10 and normal voltage is applied directly across the load circuit 2.

When a fault occurs on the load circuit 2, sufficient current flows through the shunt 16 to cause the trip coil 15 to effect the opening of the circuit breaker 13 so that the resistors 18 are again connected in series with the load circuit 2 to limit the current supplied thereto. Thus reduced current continues to flow until the load resistance again increases to a sufficient value to effect, in the manner heretofore described, the reclosing of the circuit breaker 13 in response to the closing of the contacts 26 of the voltage relay 20.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an alternating current circuit, a direct current load circuit, an electric valve interconnecting said circuits, a circuit interrupter for connecting said valve to said alternating current circuit, current limiting means connected between said valve and said alternating current circuit when said circuit interrupter is open, and means dependent upon the voltage drop produced across said direct current circuit by the current supplied thereto by said valve for closing said circuit interrupter.

2. In combination, an alternating current circuit, a direct current load circuit, an electric valve interconnecting said circuits, a circuit interrupter between said valve and said alternating current circuit, current limiting means connected in series between said valve and said alternating current circuit when said interrupter is open, means for opening said interrupter, and means dependent upon the voltage across said direct current circuit for closing said interrupter.

3. In combination, an alternating current circuit, a direct current load circuit, an electric valve interconnecting said circuits, a circuit interrupter between said valve and said alternating current circuit, current limiting means connected in series between said valve and said alternating current circuit when said interrupter is open, means responsive to a fault on said direct current load circuit for opening said interrupter, and means for reclosing said interrupter in response to the voltage across said load circuit increasing above a predetermined value.

4. In combination, an alternating current circuit, a direct current load circuit, an electric valve interconnecting said circuits, a circuit interrupter between said valve and said alternating current circuit, current limiting means connected in series between said valve and said alternating current circuit when said interrupter is open, means responsive to a fault on said direct current load circuit for opening said interrupter, and means for reclosing said interrupter in response to the resistance of said load circuit increasing above a predetermined value.

5. In combination, a polyphase circuit, a direct current load circuit, electric valve means interconnecting said circuits, a circuit interrupter between said valve and said polyphase circuit, current limiting means connected in series with said valve means and one phase of said polyphase circuit when said interrupter is open, and means dependent on the voltage drop produced across said load circuit by the current supplied thereto by said valve means when said interrupter is open for reclosing said interrupter.

6. In combination, a polyphase circuit, a direct current load circuit, electric valve means interconnecting said circuits, a circuit interrupter between said valve and said polyphase circuit, current limiting means connected in series with said valve means and one phase of said polyphase circuit when said interrupter is open, and means responsive to the voltage across said load circuit increasing above a predetermined value for reclosing said interrupter.

HERMAN BANY.